United States Patent
Wilson, Jr. et al.

(10) Patent No.: US 8,606,680 B2
(45) Date of Patent: Dec. 10, 2013

(54) METHOD FOR TRADING AND CLEARING VARIANCE SWAPS

(75) Inventors: Donald R. Wilson, Jr., Chicago, IL (US); Yuhua Yu, Chicago, IL (US)

(73) Assignee: DRW Innovations, LLC, Chicago, IL (US)

( * ) Notice: Subject to any disclaimer, the term of this patent is extended or adjusted under 35 U.S.C. 154(b) by 125 days.

(21) Appl. No.: 13/134,355

(22) Filed: Jun. 6, 2011

(65) Prior Publication Data

US 2012/0310809 A1    Dec. 6, 2012

(51) Int. Cl.
*G06Q 40/00* (2012.01)
(52) U.S. Cl.
USPC .............................. 705/36 R; 705/35; 705/38
(58) Field of Classification Search
USPC ............................................................. 705/35
See application file for complete search history.

(56) References Cited

U.S. PATENT DOCUMENTS

| | | | |
|---|---|---|---|
| 6,141,653 A * | 10/2000 | Conklin et al. ................. | 705/80 |
| 6,173,276 B1 * | 1/2001 | Kant et al. ....................... | 706/50 |
| 6,292,787 B1 * | 9/2001 | Scott et al. ................... | 705/36 R |
| 6,304,858 B1 | 10/2001 | Mosler et al. | |
| 6,493,682 B1 * | 12/2002 | Horrigan et al. ............. | 705/36 R |
| 6,834,811 B1 * | 12/2004 | Huberman et al. .......... | 236/49.3 |
| 6,954,931 B2 * | 10/2005 | Shetty et al. ................... | 718/104 |
| 6,983,257 B2 * | 1/2006 | Gatto ........................... | 705/36 R |
| 7,016,870 B1 * | 3/2006 | Jones et al. ....................... | 705/35 |
| 7,062,458 B2 * | 6/2006 | Maggioncalda et al. ... | 705/36 R |
| 7,103,580 B1 * | 9/2006 | Batachia et al. ................ | 705/80 |
| 7,149,716 B2 * | 12/2006 | Gatto ........................... | 705/36 R |
| 7,249,081 B2 * | 7/2007 | Shearer et al. .............. | 705/36 R |
| 7,321,871 B2 * | 1/2008 | Scott et al. ................... | 705/36 R |
| 7,328,184 B1 | 2/2008 | Krause | |
| 7,493,280 B2 * | 2/2009 | Guler et al. ..................... | 705/37 |
| 7,636,680 B2 * | 12/2009 | Gatto ........................... | 705/36 R |
| 7,698,248 B2 * | 4/2010 | Olson ............................ | 706/56 |
| 7,702,556 B2 * | 4/2010 | Charnley, Jr. ............... | 705/36 R |
| 7,774,257 B2 * | 8/2010 | Maggioncalda et al. ... | 705/36 R |
| 7,778,856 B2 * | 8/2010 | Reynolds et al. ............ | 705/7.28 |
| 7,788,155 B2 * | 8/2010 | Jones et al. .................. | 705/36 R |
| 7,788,205 B2 * | 8/2010 | Chalasani et al. ............. | 706/48 |
| 7,813,527 B2 * | 10/2010 | Wang ............................ | 382/103 |
| 7,813,989 B2 * | 10/2010 | Jones et al. .................. | 705/36 R |
| 8,326,715 B2 * | 12/2012 | Feuser et al. ..................... | 705/35 |
| 2002/0002521 A1 * | 1/2002 | Shearer et al. .................. | 705/36 |
| 2002/0138386 A1 * | 9/2002 | Maggioncalda et al. ....... | 705/36 |
| 2002/0165814 A1 * | 11/2002 | Lee et al. ......................... | 705/37 |
| 2003/0014293 A1 * | 1/2003 | Shetty et al. ....................... | 705/8 |
| 2003/0078867 A1 * | 4/2003 | Scott et al. ..................... | 705/36 |
| 2003/0172018 A1 * | 9/2003 | Chen et al. ..................... | 705/36 |
| 2003/0182224 A1 * | 9/2003 | Horrigan et al. ................ | 705/37 |
| 2004/0024692 A1 | 2/2004 | Turbeville et al. | |
| 2004/0054610 A1 * | 3/2004 | Amstutz et al. ................. | 705/36 |

(Continued)

*Primary Examiner* — Kristen Apple
(74) *Attorney, Agent, or Firm* — NovusIP.LLC

(57) ABSTRACT

In accordance with the principles of the present invention, a method for trading and clearing a volatility or variance-defined, standardized derivative financial instrument is provided. A financial instrument in either volatility or variance terms is negotiated. The realized variance to date on an underlying of that derivative financial instrument is determined. After the derivative financial instrument is negotiated and the realized variance to date is determined, at least one centrally-cleared financial instrument with a price derived from the volatility or variance terms and the realized variance to date on the underlying of that derivative financial instrument is delivered. Thus, a financial instrument negotiated in either volatility or variance terms is substituted with an equivalent position in a standardized, centrally-cleared financial instrument.

19 Claims, 3 Drawing Sheets

(56) References Cited

U.S. PATENT DOCUMENTS

| | | | |
|---|---|---|---|
| 2004/0103013 A1* | 5/2004 | Jameson | 705/7 |
| 2004/0111308 A1* | 6/2004 | Yakov | 705/8 |
| 2004/0111350 A1* | 6/2004 | Charnley, Jr. | 705/36 |
| 2004/0133526 A1* | 7/2004 | Shmueli et al. | 705/80 |
| 2004/0260645 A1* | 12/2004 | Yakos | 705/39 |
| 2005/0065808 A1* | 3/2005 | Faltings | 705/1 |
| 2005/0080704 A1* | 4/2005 | Erlach et al. | 705/36 |
| 2005/0144064 A1* | 6/2005 | Calabria et al. | 705/14 |
| 2007/0050274 A1* | 3/2007 | Rogatz | 705/35 |
| 2007/0055609 A1 | 3/2007 | Whitehurst et al. | |
| 2007/0198387 A1* | 8/2007 | Uenohara et al. | 705/36 R |
| 2007/0239589 A1 | 10/2007 | Wilson, Jr. et al. | |
| 2008/0249956 A1 | 10/2008 | Connors | |
| 2009/0006226 A1* | 1/2009 | Crowder | 705/30 |
| 2009/0018969 A1* | 1/2009 | Ayres et al. | 705/36 R |
| 2010/0332373 A1* | 12/2010 | Crabtree et al. | 705/37 |
| 2011/0295766 A1* | 12/2011 | Tompkins | 705/36 R |
| 2013/0024396 A1* | 1/2013 | Wilhelm et al. | 705/36 R |
| 2013/0041804 A1* | 2/2013 | Glinberg et al. | 705/37 |

\* cited by examiner

METHOD FOR TRADING AND CLEARING VARIANCE SWAPS

FIELD OF THE INVENTION

The present invention relates to financial instruments and to the electronic clearing and settling of such financial instruments.

BACKGROUND OF THE INVENTION

A variety of different types of financial instruments are traded throughout the world, including shares of stock and derivatives. Shares of stock typically take the form of shares of either common stock or preferred stock. As a unit of ownership, common stock typically carries voting rights. A derivative is a financial instrument whose value is linked to the price of an underlying commodity, asset, rate, index, currency, the occurrence or magnitude of an event or some such underlying. Typical examples of derivatives are futures and options.

Stocks of many individual companies may be grouped or combined in various ways to form an index. These may take the form of national or sector indices, for example. The method of weighting each stock within the index may also vary. Some common examples of stock index weighting methodologies include: price-weighted, such as the Dow Jones Industrial Average promulgated by Dow Jones Indexes, P.O. Box 300, Princeton, N.J. 08543, and capitalization-weighted, such as the S&P 500 Index promulgated by Standard & Poor's, 55 Water Street, New York, N.Y. 10041.

Several derivative products have been listed based on the S&P 500 Index. CME Group, 20 South Wacker Drive, Chicago, Ill. 60606, lists futures on the S&P 500 Index which expire quarterly into cash at the price of the S&P 500 Index Special Opening Quotation (SOME) on designated expiration dates. SOQs are calculated per normal index calculation procedures except that the values for the respective components are taken as the actual opening values for each of the component equities. CME Group has further listed options on the S&P 500 futures. In addition, the Chicago Board Options Exchange (CBOE), 400 South LaSalle Street, Chicago, Ill. 60605 lists options on the S&P 500 Index.

Volatility is a measure for variation of price of a financial instrument over time. Historical volatility is derived from a time series of past market prices. Historical volatility is also commonly referred to as realized or delivered volatility. Standard deviation is the most common but not the only way to calculate historical volatility. Standard deviation is a measure of how much variation or 'dispersion' there is from the average. Any sampling interval may be used, with the most common being daily or monthly. Another method commonly used for measuring volatility is variance. Variance is a measure of how far a set of numbers are spread out from each other. Variance is equal to the square of standard deviation. It is computed as the average squared deviation of each number from its mean.

Implied volatility is the value of volatility implied by the market price of a derivative, given a particular pricing model. In other words, if all other inputs related to an option (strike, expiry date, interest rate, underlying price) are known, for a given pricing model it is possible to derive the forward value of volatility that the market expects, starting from today until that option expires. This value is known as implied volatility. Often, the implied volatility of an option is a more useful measure of the relative value of the option than the price of that option. This is because the price of an option depends most directly on the price of its underlying. If an option is held as part of a directionally hedged portfolio, then the next most important factor in determining the value of the option will be its implied volatility. In some markets, options are quoted in terms of volatility rather than price.

Volatility instruments are derivative financial instruments where the payoff depends on some measure of the volatility of an asset, index, rate or other underlying. The most commonly traded volatility instruments reference an equity index as their underlying; however, any underlying asset or instrument may be used, such as an individual equity, gold, gold futures, oil futures, foreign exchange rates, interest rates, etc. Some volatility instruments are derived from the implied volatility of the referenced derivative. One popular example of such a financial instrument is the CBOE's Volatility Index, commonly referred to as the VIX, which is calculated from the weighted average of implied volatilities of various options on the S&P 500 Index. The CBOE Futures Exchange, 400 South LaSalle Street, Chicago, Ill. 60605 (CFE) computes and disseminates the value of the VIX in real time. The CBOE also lists options based on the VIX and the CFE lists futures and options on the futures based on the VIX.

There are also volatility instruments that track the historical volatility of an underlying. Examples include cleared financial instruments such as the Variance Futures listed on CFE and realized volatility financial instruments created by The Volatility Exchange (VolX), The VolX Group Corporation, P.O. Box 58, Gillette, N.J. 07933. The most commonly traded financial instruments that track historical volatility; however, are over-the-counter (OTC) variance swaps.

Variance swaps have traditionally been customized financial instruments that are traded in the OTC market. The OTC market most commonly refers to privately negotiated trades between two parties that are not centrally cleared (L e. uncleared). Each party looks solely to the other party for performance and is thus exposed to the credit risk of the other party (this risk is often referred to as counterparty risk). There is no independent guarantor of performance. Uncleared swaps and other uncleared financial instruments are often transacted pursuant to International Swaps and Derivatives Association (ISDA) master documentation. The ISDA, 360 Madison Avenue, $16^{th}$ Floor, New York, N.Y. 10017 is an association formed by the privately negotiated derivatives market and represents participating parties.

When a trade is centrally cleared, the credit and performance risk of the parties to one another is removed. Stated differently, the parties to a trade are not counterparties to one another. Each party faces a clearinghouse and looks solely to the clearinghouse for performance. A clearinghouse is an agency of an exchange or separate entity responsible for settling and clearing trades, collecting and maintaining margin, regulating delivery, and reporting trading data.

During the 2008 financial crisis, many participants in uncleared financial instruments faced counterparties that were unable to meet their obligations. In the wake of the 2008 financial crisis, the Dodd-Frank Wall Street Reform and Consumer Protection Act (the "Dodd-Frank Act") (Pub. L. 111-203, H.R. 4173) was signed into law. The Dodd-Frank Act mandates the migration of swaps to central clearing.

Since enactment of the Dodd Frank Act, the Commodity Futures Trading Commission (CFTC) and the Securities Exchange Commission (SEC) have proposed a multitude of rules on a variety of topics, including mandatory centralized clearing, capital requirements of certain types of market participants, and transparency through execution of trades on the central limit order book of a transaction facility. Rules have also been proposed concerning segregation of cash balances, depending on whether a financial instrument is executed on an exchange or a swap execution facility (SEF), and the resulting protections associated with such segregation. While these rules are still proposals, it is clear that many formerly accepted practices will be required to change.

While variance swaps have traditionally been uncleared, certain bilaterally-traded financial instruments can be submitted to a clearinghouse for central clearing. As noted above, once the trade is accepted by a clearinghouse, the counterparty risk is eliminated. Just as with exchange-traded instruments, both parties to a trade face the clearinghouse and look solely to the clearinghouse for performance. For example, on CME Group's ClearPort facility, uncleared trades in certain financial instruments may be converted into futures or futures options upon acceptance by CME's clearinghouse. In effect, these uncleared financial instruments go through a transformation into cleared futures or futures options. Other financial instruments may be accepted by a clearinghouse for central clearing, but do not convert into futures. In both case, like all centrally-cleared trades, the counterparty risk between parties to the trade is eliminated.

Because of the different ways that collateral is treated for cleared and uncleared financial instruments, unless an adjustment is made, cleared and uncleared financial instruments with the same terms may have different values. Clearinghouses apply a concept known as variation margin to cleared financial instruments. The clearinghouse requires the party that has an unrealized loss on a position in a cleared financial instrument to post margin equal to the amount of the loss, and that amount is credited to the party that has a profit. The party that receives the variation margin is the owner of that money and can earn interest on or otherwise invest it. On the other hand, for an uncleared trade, the party who has an unrealized loss on the trade normally posts collateral with its counterparty, the party that has a corresponding gain on the uncleared instrument. The standard practice is that the collateral remains the property of the party posting the collateral, and all interest received on the collateral is for the benefit of the party posting the collateral. These very different treatments of collateral in the cleared and uncleared context can cause otherwise similar cleared and uncleared financial instruments to have different values. This difference in value is in part dependent on both the interest that market participants can receive on funds and the correlation between the instrument and interest rates in general.

To facilitate the transition of uncleared instruments to central clearing, there have been various efforts to construct cleared financial instruments such that they will transact and settle to a value equal to their uncleared counterparts. One attempt to address this issue was the introduction of the "Price Alignment Interest" (PAI) in 2008 on the SwapClear Facility of LCH.Clearnet, Aldgate House, 33 Aldgate High Street, London EC3N 1EA U.K. (LCH.Clearnet is an independent clearinghouse serving exchanges and trading platforms, as well as a range of OTC markets; SwapClear is a service for the central clearing of OTC interest-rate swaps.) Counterparties initially enter into a bilateral interest-rate swap and subsequently submit the swap for clearing through LCH.Clearnet.

LCH.Clearnet introduced PAI in an attempt to eliminate the difference in the value between cleared and uncleared swaps with similar terms. As noted in the LCH.Clearnet rules, "[t]he payment of variation margin, or change in NPV [net present value], on a daily basis without adjustment would distort the pricing for swaps cleared through the Clearing House." LCH.Clearnet Rule 2C.6.4. To attempt to address this distortion, LCH.Clearnet charges interest on cumulative variation margin received and pays interest on cumulative variation margin paid.

Eris Exchange, 311 South Wacker Drive, Suite 950, Chicago, Ill. 60606, a futures exchange operating as an exempt board of trade under the jurisdiction of the CFTC, lists cleared interest-rate swap futures and has also addressed the issue of the difference in value. Instead of using the PAI concept, Eris Exchange has listed interest-rate swap futures with a terminal value that adjusts for interest received and paid on variation margin over the life of the interest-rate swap future. (http://www.erisfutures.com/contract-specifications-summary, visited on 12 May 2011.)

Returning to the various volatility instruments in common use, the CFE's Variance Futures are cash settled to the three-month (or twelve-month) realized variance of the S&P 500 Index. The CFE's Variance Futures are traded in variance points, defined as realized variance (RV) multiplied by 10,000 according to the following:

$$RV = 252 \times \left( \sum_{i=1}^{N_a-1} R_i^2 / (N_e - 1) \right)$$

where:
$R_i$ is $\ln(P_{i+1}/P_i)$–daily return of the S&P 500 Index from $P_i$ to $P_{i+1}$;
$P_{i+1}$ is the final value of the S&P 500 Index used to calculate the daily return;
$P_i$ is the initial value of the S&P 500 Index used to calculate the daily return;
$N_e$ is the number of expected S&P 500 Index values needed to calculate daily returns during the three-month period; the total number of daily returns expected during the three-month period is $N_e-1$; and
$N_a$ is the actual number of S&P 500 Index values used to calculate daily returns during the three-month (or twelve-month) period.

For example, a variance calculation of 0.06335 would have a corresponding price quotation in variance points of 633.50. The notional value is defined as $50 per variance point or, in this example, 633.50×$50=$31,675. Due to this specification, the unit size, which in this example is also the variance unit, is fixed. The period over which the variance is computed is referred to herein as the variance accrual period.

VolX lists similar futures financial instruments, called Vol-Contracts, with one-month, three-month and twelve-month periods. The main difference between the VolContracts and CFE's Variance Futures financial instrument is that VolContracts financial instruments are settled to the realized volatility—the square root of the realized variance as defined above—instead of the realized variance. The CME monthly Euro FX VolContract, for example, settles to $1,000 times the annualized one-month standard deviation of the continuously compounded daily returns of the Euro FX CME currency futures, quoted in percentage terms.

As noted above, in the OTC space, somewhat similar financial instruments known as variance swaps are commonly traded. These variance swaps are settled to: variance units× (variance strike–volatility$^2$). If this quantity is positive, the buyer will make a payment of this amount to the seller; if this quantity is negative, the seller will make a payment of this amount to the buyer. Using the same notation as before, the volatility is defined by:

$$100 \times \sqrt{\frac{1}{n-1}\sum_{i=1}^{m} R_i^2} \times \sqrt{\text{Business days per year}}$$

where, n is the number of days, as of the trade date, that are expected to be scheduled trading days for the period from and including the trade date to, and including, the scheduled valuation date; and m=n, unless there is a market disruption event. The counterparties agree on a volatility strike and a notional Vega, then the variance strike is computed as the square of the volatility strike, and the variance unit is computed as notional Vega/(2×volatility strike). Vega, the derivative of the option value with respect to the volatility of the underlying asset, measures sensitivity to volatility.

Other than spot-starting variance swaps, where the accrual period starts immediately after the trade date, forward-starting variance swaps can also be traded. In a forward-starting variance swap the accrual period starts on a future date. The contract definition and valuation of a forward-starting variance swap are very similar to a spot-starting variance swap. The variance swaps discussed below will include both forward-starting and spot-starting, unless otherwise noted.

Differences between uncleared volatility instruments and the various available exchange-traded volatility instruments make the cleared versions less preferable. However, the combination of the appetite to reduce counterparty risk, in addition to the Dodd-Frank Act mandates regarding centralized clearing, mean that it would be desirable for an economically equivalent financial instrument with similar quoting and pricing conventions to exist in the cleared space.

For example, one difference between uncleared volatility instruments and the exchange-traded VIX financial instrument is that the VIX financial instrument tracks the implied volatility of options on the underlying index, which is a forward looking volatility, while variance swaps track the historical volatility of the underlying index, which is a backward looking volatility. It would therefore be desirable to design an exchange-traded or centrally-cleared financial instrument which, like variance swaps, references the historical volatility of an underlying.

In addition, a difference between the uncleared variance swaps and the variance futures listed on the CFE is that the uncleared variance swaps are typically traded in terms of volatility strike and notional Vega, while the CFE variance future is traded in terms of variance points and variance units. Further, the CFE's financial instrument lacks the flexibility of the variance accrual periods. Since the OTC space allows for fully tailored financial instruments, participants frequently trade swaps that start to accrue variance the day following the trading day and expire at a negotiated future date, while the CFE futures expire on the third Friday of the expiring month with a three-month or twelve-month accrual period. When a CFE variance future is traded inside the accrual period, the price not only reflects the market expectation of the variance from the trading date to expiration, but also carries a component of the accrued variance. This makes it difficult to compare the valuation of the variance future to the uncleared variance swap. It would therefore be desirable to design, a centrally-cleared, variance-based, financial instrument that is traded in the same convention as the uncleared version.

Variance has various characteristics that make it easier to value and replicate than volatility. It has been estimated that variance swaps (as opposed to volatility swaps) constitute well over 90% of the OTC market in volatility instruments. The fact that variance is linear in time means that variance swaps are relatively easy to value and hedge. For example, a variance swap with an accrual period from time $t_0$ to time $t_1$ is equivalent to the combination of two variance swaps with accrual periods from time $t_0$ to $t_S$ ($t_0 < t_S < t_1$) and from time $t_s$ to $t_1$. CME monthly Euro FX VolContract Volatility, which is the valuation method used by VolContract does not have this linear behavior. Another reason for the popularity of variance swaps is that they can be statically replicated by a strip of options. Recent efforts to convert uncleared financial instruments into equivalent cleared financial instruments utilize PAI or terminal value adjustments. Without further standardization, these adjustments would result in the creation of excessive strikes or equivalent, each of which would correspond to a different cleared financial instrument. This increase in such cleared financial instruments could imply significantly different trading and liquidity characteristics from traditional cleared financial instruments. For example, variance swaps with different variance accrual periods or strikes will correspond to different cleared financial instruments.

Participants in uncleared variance swaps frequently trade swaps that start to accrue variance the day following the trading day and expire at a negotiated future date. While the expiration date often coincides with a listed option expiration date on the same underlying, two uncleared financial instruments of similar specifications, but traded one day apart, will not offset one another. In the cleared space, it is more common to designate a fixed accrual period. It would therefore be desirable to design exchange-traded financial instruments which would be economically equivalent to an uncleared variance swap but only have specified accrual periods.

Furthermore, the majority of the uncleared variance swaps are traded at par—the volatility strike is set such that the initial value of the swap is zero. Even if two swaps are traded on the same day with the same expiration, these two swaps can have different volatility strikes due to the change in expectation of future volatility. To replicate those swaps with cleared financial instruments, each cleared financial instrument will have a different volatility or variance strike. This implies that if a market participant trades the cleared financial instrument with the same expiration at different times on the same day, for example long 30 at 30% volatility strike, long 30 at 32% volatility, and short 60 at 31% volatility, that market participant will have open positions in three financial instruments. In order to exit all open positions, orders must be placed resulting in off-setting trades for each of the three financial instruments.

This granularization of instruments available for trading results in relatively low levels of open interest occurring for each individual instrument, which can add difficulty for a trader to find willing buyers and sellers to act as counterparties at reasonable prices. Therefore it would be desirable to mitigate this granularization issue.

SUMMARY OF THE INVENTION

Exchange-traded financial instruments in accordance with the principles of the present invention provide an economically equivalent financial instrument to uncleared variance swap instruments with similar quoting and pricing conventions in the cleared space. Like variance swaps, centrally-cleared financial instruments in accordance with the principles of the present invention reference the historical volatility of an underlying. Centrally-cleared, variance-based financial instruments in accordance with the principles of the present invention trade in the same convention as the uncleared version. Centrally-cleared, variance-based financial instruments in accordance with the principles of the present invention are economically equivalent to uncleared variance swaps but only have specified accrual periods. Centrally-cleared, variance-based financial instruments in accordance with the principles of the present invention provide automatic standardization to mitigate the granularization issue.

In accordance with the principles of the present invention, a method for trading and clearing a volatility or variance-defined, standardized derivative financial instrument is provided. A financial instrument in either volatility or variance terms is negotiated. The realized variance to date on an underlying of that derivative financial instrument is determined. After the derivative financial instrument is negotiated, and the realized variance to date is determined, at least one centrally-cleared financial instrument with a price derived from the volatility or variance terms and the realized variance to date on the underlying of that derivative financial instrument is delivered for that financial instrument. Thus, a financial instrument negotiated in either volatility or variance terms is substituted with an equivalent position in a standardized, centrally-cleared financial instrument.

DETAILED DESCRIPTION OF PREFERRED EMBODIMENTS

The present invention provides a mechanism whereby a financial instrument negotiated in either volatility or variance terms can be delivered with an equivalent position in a standardized, centrally-cleared financial instrument. When used herein, the term equivalent means nearly equal in amount, value, measure, force, effect, significance, etc., and encompasses an instrument with a different variance strike, at an adjusted price, having a nearly-equivalent but economically satisfactory position. In accordance with the principles of the present invention, a volatility- or variance-defined, standardized financial instrument and method of trading are provided.

The present invention permits a market participant to trade a variance swap in volatility or variance terms for a specific expiration date, and later unwind the variance swap without negotiating a tear-up value. After a trade is consummated, the exchange or clearing house will deliver a centrally-cleared financial instrument or a series of centrally-cleared financial instruments with a payoff derived from the realized variance within a predetermined time period and standard variance unit.

Figure 1:
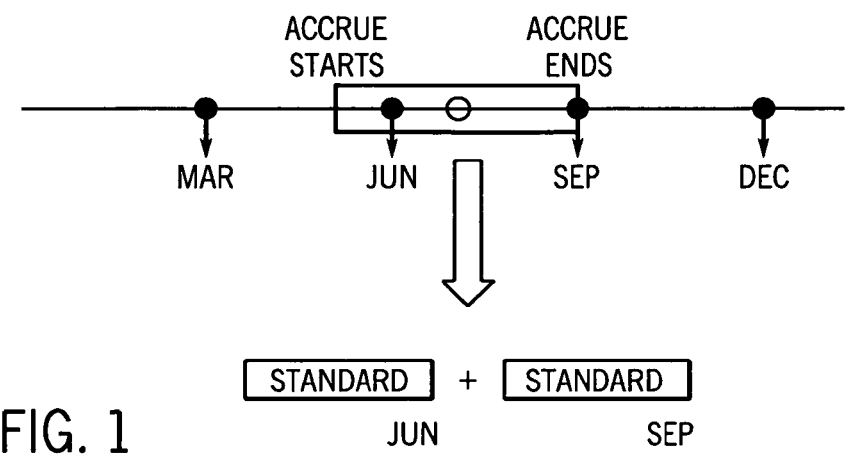
FIG. 1 is a chart setting forth an example of how a financial instrument can be delivered for a variance swap with non-standard accrual period in accordance with the present invention.

If the time period between the trade date and the expiration date can be covered by one standardized financial instrument, then only one financial instrument will be delivered; otherwise, a series of standardized financial instruments that cover the time period can be delivered. FIG. 1 is a chart setting forth an example of how a financial instrument can be delivered for a variance swap with non-standard accrual period in accordance with the present invention.

If the trade is negotiated in terms of volatility strike, the volatility strike can be converted into variance points, taking into account of the realized variance already accrued to date in the standardized financial instrument. Specifically, if there is no realized variance accrued on the date of the trade, then variance point=volatility strike$^2$; otherwise, let $R_1, \ldots, R_n$ be the n periods of return already realized and $N_e$ be the total number of business days in the accrual period of the standardized financial instrument, then the variance point can be determined as follows:

$$\frac{252}{N_e-1} \times \left( \text{volatility strike}^2 \times \frac{(N_e-1-n)}{252} + \sum_{i=1}^{n} R_i^2 \right).$$

If the trade is negotiated in terms of the quantity of notional Vega, then the notional Vega can be converted into variance units by $$\frac{\text{notional Vega}}{2 \times \text{volatility strike} \times 100} \times \frac{N_e-1}{N_e-1-n}.$$

In particular, when n=0, this formula gives the variance unit when there is no realized variance accrued.

Figure 2:
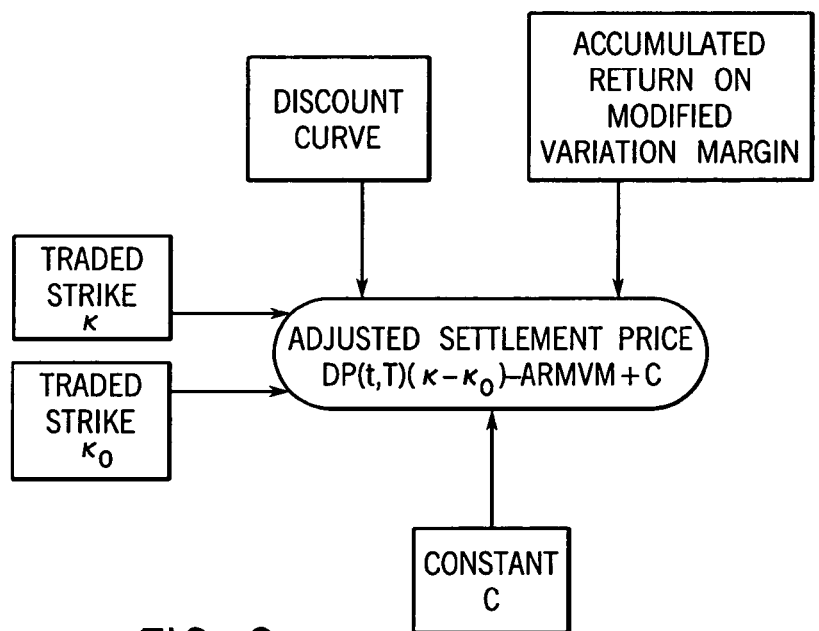
FIG. 2 is a flow-chart setting forth a general example for determining the variance strike and variance unit of a standardized financial instrument in accordance with the principles of the present invention.

Referring to FIG. 2, a flow chart is seen setting forth the general example for determining the variance strike and variance unit of a standardized financial instrument in accordance with the principles of the present invention.

Because of this automated standardization, it is possible to trade this financial instrument in a central limit order book.

In another embodiment of the present invention, a terminal value adjustment can be applied to make the standardized financial instrument economically equivalent to an uncleared variance swap; however, this results in the granularization issue described in the Background of the Invention. In accordance with the principles of the present invention, a standardization process can be used to solve this problem.

If a terminal value adjustment is applied to the standardized financial instrument to make it economically equivalent to an uncleared variance swap, the final settlement ($F_T$) of the financial instrument can be determined by the following, for a given variance strike, $k_o$, $$F_T = \text{Realized Variance} - k_0 - \sum_{t=0}^{T-1}(F_t - C) \times R_t \times \frac{B_{t,T}}{365} + C$$

where,
$R_t$ the Effective Federal Funds rate on day t;
$B_{t,T}$, accumulation factor, equals $$\left(1 + \frac{R_t}{365}\right)\left(1 + \frac{R_{t+1}}{365}\right) \ldots \left(1 + \frac{R_{T-1}}{365}\right);$$

C is a predetermined constant added to the price in order to keep it in a preferred range, for example, non-negative region; and t=0 is the first day the financial instrument has open interest.

Figure 3:
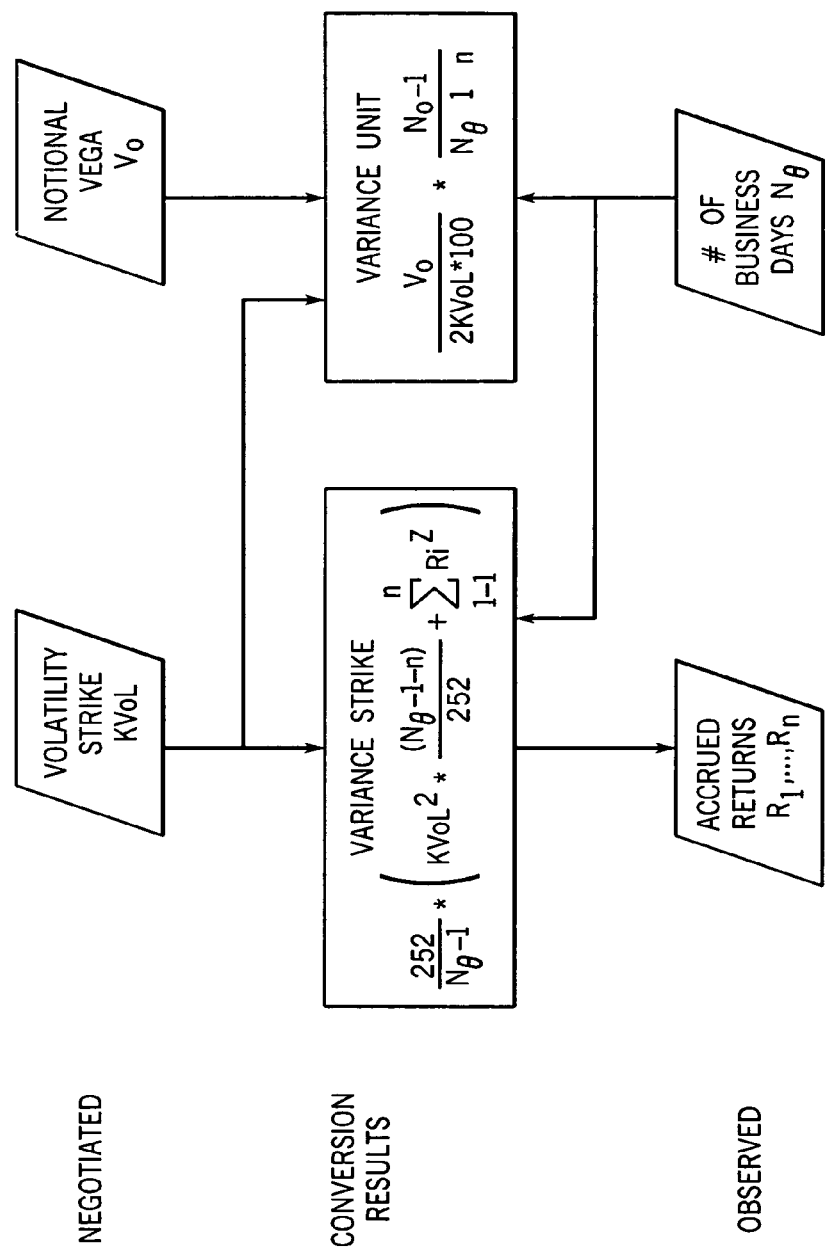
FIG. 3 is an example of how a settlement price of a financial instrument can be delivered for a specific strike from a negotiated strike in accordance with the present invention.

For a variance swap traded in terms of volatility or variance, a standardized financial instrument with a certain variance strike, $k_o$, can be assigned. The appropriate price and unit that are consistent with the quoted volatility or variance can be determined. If required, the quoted volatility strike and notional Vega will first be converted to variance points (equivalent to variance strike using the terminology of uncleared variance swaps) denoted by k, and variance units according the previous equations. There will be a further transformation from the resulting variance strike (k) to the price ($F_t$):

$$F_t = DF(t,T)(k-k_o) - ARMVM + C,$$

where DF(t,T) is the discount factor from time t to maturity T according to the appropriate discount curve and ARMVM is the so-called accumulated return on modified variation margin. The accumulated return on modified variation margin (ARMVM) is equal to zero when t=0, and $$\sum_{s=0}^{t-1} (F_s - C) * R_s * \frac{B_{s,t}}{365}$$

otherwise. FIG. 3 is an example of how the price of a financial instrument can be generated for a specific strike from a negotiated strike in accordance with the present invention.

The following are non-limiting examples of methods for trading and clearing variance swaps in accordance with the principles of the present invention.

Example 1

This example shows that a variance swap negotiated in terms of volatility strike and notional Vega can be converted into a standardized financial instrument defined in variance points.

Consider a standardized variance financial instrument that expires on 15 Jun. 2011 with the final settlement value equal to the three-month realized variance (from March 15 to June 15) of a certain underlying index or a set of prices. The unit size is $50 per variance point. Assume a trade is consummated on 22 Mar. 2011 with volatility strike of 30% and notional Vega of $1M. The daily returns of the underlying from March 15 to March 22 (five business days) are 1%, 1.5%, –3%, –0.5%, and 2%. Further assume that there are 60 business days within the three-month period. The variance point (k) can be computed as follows:

$$k = \frac{252}{N_e - 1} \times \left( \text{volatility strike}^2 \times \frac{(N_e - 1 - n)}{252} + \sum_{i=1}^{n} R_i^2 \right),$$

or $$k = \frac{252}{59} \times \left( 30^2 \times \frac{59-5}{252} + (1^2 + 0.5^2 + 0.3^2 + 0.1^2 + 0.5^2) \right) = 894.2.$$

The notional Vega can be converted to variance units as follows:

$$\text{variance unit} = \frac{\text{notional Vega}}{2 \times \text{volatility strike} \times 100} \times \frac{N_e - 1}{N_e - 1 - n},$$

or $$\text{variance unit} = \frac{1000000}{2 \times 30} \times \frac{59}{59-5} = 182.10.$$

With the given unit size, this is rounded to 364 (~18210/50) financial instruments. To summarize, a trade which was consummated with a volatility strike of 30% and a notional value of $1M which, using the principles of the current invention, is converted to 364 centrally cleared financial instruments with a price of 894.2.

Example 2

This example shows that a variance swap negotiated in volatility strike and notional Vega can be converted to a standardized financial instrument with a different strike by utilizing a price transformation, when a terminal value adjustment is used to convert uncleared financial instruments into equivalent cleared financial instruments.

Consider an uncleared variance swap traded on 22 Mar. 2011 with volatility strike 30%, expiring on 15 Jun. 2011 (the payoff is based on the realized variance from March 20 to June 15) with the notional Vega of $1 M. Assume further the standardized financial instrument expires on 15 Jun. 2011 with three-month realized variance period (from March 15 to June 15) and a strike of $30^2$. Further, assume the same scenario as in Example 1—from March 15 to March 22 (five business days), the daily returns of the underlying are 1%, 1.5%, –3%, –0.5%, and 2%, and there are 60 business days within the three-month period.

As already shown in Example 1, the variance strike corresponding to 30% is k=894.2, and variance unit corresponding to $1M of notional Vega is 18210. A terminal value adjustment can be used to create a centrally-cleared financial instrument that is economically equivalent to a variance swap with a volatility of 30%, or variance strike of 894.2, by the following, using the same notations as before:

$$F_T = \text{Realized Variance} - k_0 - \sum_{t=0}^{T-1} (F_t - C) \times R_t \times \frac{B_{t,T}}{365} + C.$$

However, this introduces the granularization issue because every time a different volatility strike is traded, a corresponding financial instrument with a different variance strike needs to be created. To mitigate this issue, the traded variance strike can be converted to the price of a financial instrument with a predetermined strike. In this example, the traded variance strike 894.2 can be converted to the price of the $30^2$ strike, assuming the discount factor from the trade day March 22 to expiration June 15 is 0.996, and the constant C is 100, as follows:

$$F_t = DF(t,T)(k-k_o) - ARMVM + C,$$

or $$F_t = 0.996 \times (894.2 - 30^2) - 100 = 94.2232,$$

if it is the first day that the $30^2$ strike financial instrument has been traded; otherwise, the accumulated return on modified variation margin needs to be subtracted from the price. Therefore a standardized financial instrument with a strike of $30^2$ can be delivered to counterparties at a price that is consistent with the negotiated volatility or variance strike.

Again, the foregoing are non-limiting examples of methods for trading and clearing variance swaps in accordance with the principles of the present invention.

The present invention is not limited and can be cleared on any clearinghouse, traded on any exchange or trading platform, regardless of whether located in the United States or abroad, traded through any price discovery process, including a central limit order book, private negotiation, an auction, traded in currencies other than United States dollars, and traded in many forms of derivatives. When used herein, the terms exchange and trading platform refer broadly to a marketplace in which securities, commodities, derivatives, and other derivatives can be traded, and include, but are not limited to, designated contract markets, exempt boards of trade, derivatives clearing organizations, securities exchanges, swap execution facilities, electronic communications networks, and the like.

According to the principles of the present invention, in order to publish daily and terminal settlement values a clearinghouse, exchange, futures commission merchant or other market participant may use computers with software specifically designed for this purpose. The computations in accordance with the present invention are iterative and complex, and special software is required for this purpose. This software may be linked to a centralized marketplace via data lines, networks or the Internet, so that the information is disseminated in a seamless manner. The clearinghouse may store the daily prices for each derivative in existence at any given moment in a database that can be electronically published to the marketplace.

Figure 4:
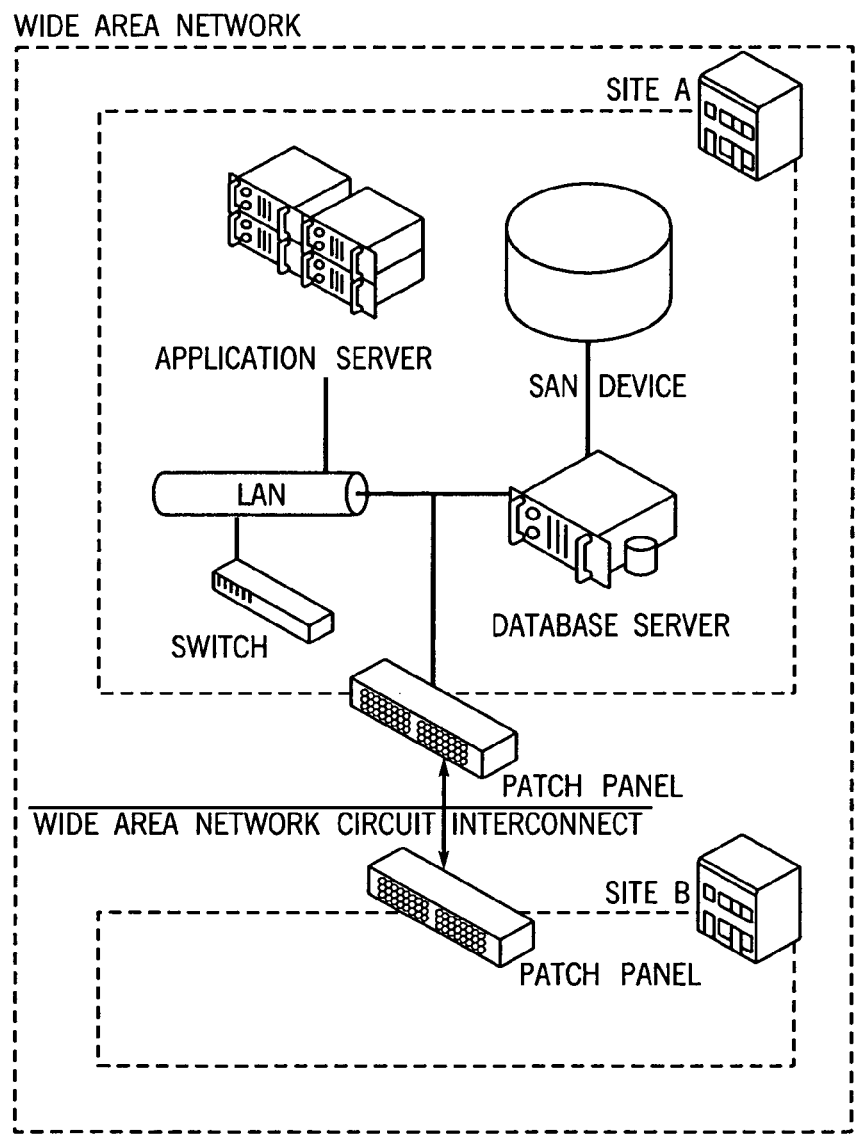
FIG. 4 is a non-limiting example of a hardware infrastructure that can be used to run a system that implements electronic trading and clearing of the financial instrument of the present invention.

Referring to FIG. 4, a non-limiting example of a high-level hardware implementation that can used to run a system of the present invention is seen. The infrastructure should include but is not be limited to: wide area network connectivity, local area network connectivity, appropriate network switches and routers, electrical power (backup power), storage area network hardware, server-class computing hardware, and an operating system such as for example Redhat Linux Enterprise AS Operating System available from Red Hat, Inc, 1801 Varsity Drive, Raleigh, N.C.

The clearing and settling and administrative applications software server can run for example on an HP ProLiant DL 360 G6 server with multiple Intel Xeon 5600 series processors with a processor base frequency of 3.33 GHz, up to 192 GB of RAM, 2 PCIE expansion slots, 1 GB or 10 GB network controllers, hot plug SFF SATA drives, and redundant power supplies, available from Hewlett-Packard, Inc, located at 3000 Hanover Street, Palo Alto, Calif. The database server can be run for example on a HP ProLiant DL 380 G6 server with multiple Intel Xeon 5600 series processors with a processor base frequency of 3.33 GHZ, up to 192 GB of RAM, 6 PCIE expansion slots, 16 SFF SATA drive bays, an integrated P410i integrated storage controller, and redundant power supply, available from Hewlett-Packard.

While the invention has been described with specific embodiments, other alternatives, modifications, and variations will be apparent to those skilled in the art. For example, the principles of the present invention could be implemented as applied to a future instead of the described variance swap. Accordingly, it will be intended to include all such alternatives, modifications, and variations set forth within the spirit and scope of the appended claims.

What is claimed is:

1. A method for trading and clearing a standardized financial instrument comprising:

negotiating a derivative financial instrument in either volatility or variance terms;

electronically determining the realized variance to date on an underlying of that derivative financial instrument on at least one processor; and after the derivative financial instrument is negotiated and the realized variance to date is determined, delivering at least one centrally-cleared financial instrument with a price electronically derived from the volatility or variance terms and the realized variance to date on the underlying of that derivative financial instrument on at least one processor;

whereby a financial instrument negotiated in either volatility or variance terms can be substituted with an equivalent position in a standardized, centrally-cleared financial instrument.

2. The method for trading and clearing a standardized financial instrument of claim 1 further including electronically determining on at least one processor a payoff from the volatility or variance on the underlying of the derivative financial instrument.

3. The method for trading and clearing a standardized financial instrument of claim 2 further including utilizing at least one processor to electronically deliver at least one centrally-cleared financial instrument with a payoff determined from the realized variance over a predetermined time period.

4. The method for trading and clearing a standardized financial instrument of claim 1 further including, if the time period between the trade date and the expiration date can be covered by one standardized financial instrument, delivering one standardized financial instrument.

5. The method for trading and clearing a standardized financial instrument of claim 1 further including, if the time period between the trade date and the expiration date cannot be covered by one standardized financial instrument, delivering a series of standardized financial instruments that cover the time period.

6. The method for trading and clearing a standardized financial instrument of claim 1 further including, if the trade is negotiated in terms of volatility strike, converting the volatility strike into variance points taking into account of the realized variance already accrued to date in the standardized financial instrument.

7. The method for trading and clearing a standardized financial instrument of claim 6 further including, if there is no realized variance accrued on the date of the trade, determining the variance point as the volatility strike squared.

8. The method for trading and clearing a standardized financial instrument of claim 6 further including, if there is realized variance accrued on the date of the trade, determining the variance point in accordance with:

$$\frac{252}{N_e - 1} * \left( \text{volatility strike}^2 * \frac{(N_e - 1 - n)}{252} + \sum_{i=1}^{n} R_i^2 \right),$$

where $R_1, \ldots, R_n$ are the n periods of return already realized; and $N_e$ the total number of business days in the accrual period of the standardized financial instrument.

9. The method for trading and clearing a standardized financial instrument of claim 1 further including, if the trade is negotiated in terms of notional Vega, converting the notional Vega into variance units in accordance with:

$$\frac{\text{Dollar Vega}}{2 \text{ volatility strike} * 100} * \frac{N_e - 1}{N_e - 1 - n},$$

where $N_e$ is the total number of business days in the accrual period of the standardized financial instrument, and n is the number of periods of return already realized.

10. The method for trading and clearing a standardized financial instrument of claim 1 further including determining final settlement price ($F_T$) in accordance with:

$$F_T = \text{Realized Variance} - k_0 - \sum_{t=0}^{T-1}(F_t - C) \times R_t \times \frac{B_{t,T}}{365} + C$$

where, $k_o$ is a variance strike;
$R_t$ the Effective Federal Funds rate on day t;
$B_{t,T}$, accumulation factor, equals $$\left(1 + \frac{R_t}{365}\right)\left(1 + \frac{R_{t+1}}{365}\right) \cdots \left(1 + \frac{R_{T-1}}{365}\right);$$

C is a predetermined constant added to the price in order to keep it in a preferred range, for example, non-negative region; and
t=0 is the first day the financial instrument has open interest.

11. The method for trading and clearing a standardized financial instrument of claim 1 further including determining daily settlement price ($F_t$) in accordance with:

$$F_t = DF(t,T)(k-k_o) - ARMVM + C,$$

where

DF(t,T) is the discount factor from time t to maturity T according to the appropriate discount curve;
k is the quoted variance strike to the settlement price; and
ARMVM is the so-called accumulated return on modified variation margin.

12. The method for trading and clearing a standardized financial instrument of claim 1 further including delivering a volatility or variance-defined, standardized swap.

13. The method for trading and clearing a standardized financial instrument of claim 1 further including delivering a volatility or variance-defined future.

14. The method for trading and clearing a standardized financial instrument of claim 1 further including a price electronically derived from the volatility or variance terms, the realized variance to date on an underlying of that derivative financial instrument, and factors selected from the group comprising the number of days remaining accrual period, number of days into the accrual period, accumulated return on modified variation margin, and combinations thereof.

15. A method for trading and clearing a standardized financial instrument comprising:

negotiating a derivative financial instrument in either volatility or variance terms;
electronically determining the realized variance to date on an underlying of that derivative financial instrument on at least one processor; and
after the derivative financial instrument is negotiated and the realized variance to date is determined, displaying at least one centrally-cleared financial instrument with a price derived from the volatility or variance terms and the realized variance to date on the underlying of that derivative financial instrument;
whereby a financial instrument negotiated in either volatility or variance terms can be substituted with an equivalent position in a standardized, centrally-cleared financial instrument.

16. A method for trading and clearing a standardized financial instrument comprising:

negotiating a derivative financial instrument in volatility terms;
electronically determining the realized variance to date on an underlying of that derivative financial instrument on at least one processor; and
after the derivative financial instrument is negotiated and the realized variance to date is determined, delivering at least one centrally-cleared financial instrument with a price derived from the volatility terms and the realized variance to date on the underlying of that derivative financial instrument;
whereby a financial instrument negotiated in volatility terms can be substituted with an equivalent position in a standardized, centrally-cleared financial instrument.

17. A method for trading and clearing a standardized financial instrument comprising:

negotiating a derivative financial instrument in variance terms;
determining the realized variance to date on an underlying of that derivative financial instrument on at least one processor; and
after the derivative financial instrument is negotiated and the realized variance to date is determined, delivering at least one centrally-cleared financial instrument with a price derived from the variance terms and the realized variance to date on the underlying of that derivative financial instrument;
whereby a financial instrument negotiated in variance terms can be substituted with an equivalent position in a standardized, centrally-cleared financial instrument.

18. The method for trading and clearing a standardized financial instrument of claim 16 further including electronically determining on at least one processor a payoff from the volatility on the underlying of the derivative financial instrument.

19. The method for trading and clearing a standardized financial instrument of claim 17 further including electronically determining on at least one processor a payoff from the variance on the underlying of the derivative financial instrument.

* * * * *